No. 797,360. PATENTED AUG. 15, 1905.
A. C. KADLOWEC.
FLEXIBLE SHAFT.
APPLICATION FILED AUG. 12, 1903. RENEWED FEB. 13, 1905.
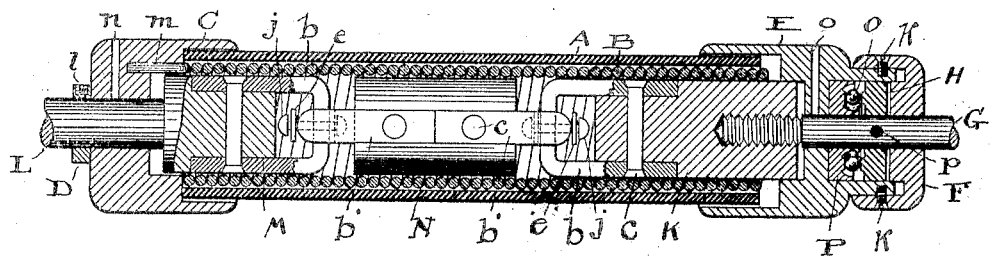
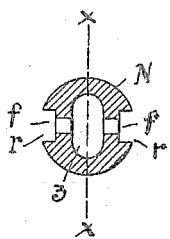 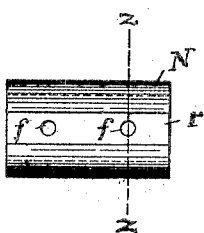 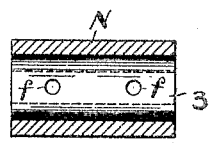
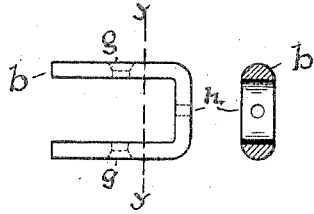 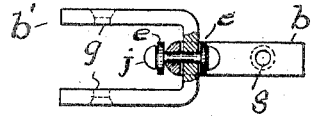 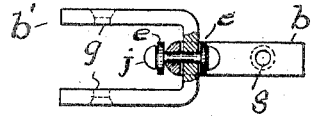
ATTEST.
E. M. Fisher.
R. Zbornik.
INVENTOR.
Alois C. Kadlowec
BY H. J. Fisher.
ATTY.

UNITED STATES PATENT OFFICE.

ALOIS C. KADLOWEC, OF CLEVELAND, OHIO.

FLEXIBLE SHAFT.

No. 797,360.    Specification of Letters Patent.    Patented Aug. 15, 1905.

Application filed August 12, 1903. Renewed February 13, 1905. Serial No. 245,399.

*To all whom it may concern:*

Be it known that I, ALOIS C. KADLOWEC, a citizen of the United States, residing at Cleveland, in the county of Cuyahoga and State of Ohio, have invented certain new and useful Improvements in Flexible Shafts; and I do declare that the following is a full, clear, and exact description of the invention, which will enable others skilled in the art to which it appertains to make and use the same.

My invention relates to improvements in flexible shafts in which revolving motion is transmitted by means of sections of metal joined in such manner as to permit of bending the shaft while applying the same to the point of use.

In the accompanying drawings, Figure 1 is a longitudinal section of the entire shaft. Fig. 2 is a cross-section of a yoke member on line $z\,z$ of Fig. 3. Fig. 3 is a side elevation of a yoke member with links removed. Fig. 4 shows a longitudinal section of a yoke on line $x\,x$, Fig. 2. Fig. 5 shows a link used in the construction of the shaft. Fig. 6 shows a section of a link on line $y\,y$, Fig. 5. Fig. 7 shows the manner of joining links and holding same in position.

Similar characters refer to similar parts throughout the several views.

A is a tubular covering, of textile fabric or leather, which protects the coil-spring B, and the said spring serves as a support for the said covering. The said spring is fastened, by means of its stem $m$, in head C and is removable with said head when the parts are separated, thereby allowing for the removal of the coil-spring and tubular covering for inspection or repairs. Such removal of the tubular covering and spring is accomplished by loosening the collar D, which is fastened to shank L of yoke M by means of set-screw 1, the said collar serving as a stop for the head C and allowing for the adjustment of the said head, which in turn allows for expansion or contraction of the shaft. The head C is adjusted backward or forward on shank L until the desired amount of play is obtained. The head C is furthermore provided with an oil-hole $n$, which permits lubrication of the shank L.

E is a head also, which serves as a thrust-bearing. Said head E is slipped over stud G and partially overlaps the tubular covering A and spring B and yoke K. Said head E is provided with an oil-hole $o$, which permits of the lubrication of stud G.

P is a round seat, of hardened metal, having a half-round groove turned in its face, and in this groove there is a raised surface on which rest the antifriction-balls O, also of hardened metal. Over or opposite the seat P and fastened to the stud G is another round seat, of hardened metal H, which has a raised surface turned on its face, between which and seat P rest the balls O. The said part H is held in position by the pin $p$, which is driven through the side of seat H and through stud G, the latter being screwed into yoke K until the desired space between seats H and P is obtained, and which regulates the freedom of revolving on said balls.

Over and into the head E, I set a cap F, which is held in position by the screws $h\,h$, through the overlapping portions of said head and cap. Pressure being brought to bear on the stud G, which in this case may be presumed to hold a tool, forces the bearing or seat H against the balls O, which in turn rest against the seat P on stud G, thereby reducing the friction. Pressure is brought to bear on seat P by a pushing force against the head E, this pressure being thrown against seat H on stud G.

K is a yoke consisting of a solid block of metal having a thread cut centrally in one end to receive the stud G, and at the other end for about two-fifths of its length diametrically opposite one another the yoke is provided with two channels to receive the link $b$, which is held in position in the said channels by rivets $c$ passing through the holes $f\,f$, Figs. 2, 3, and 4, and the holes $g$, Figs. 5 and 7. The link $b$ is engaged by another link $b'$ at right angles thereto, and said links are secured loosely together by means of a rivet $j$. This rivet passes through corresponding holes in both links, where they overlap, and has a washer $e$ under the head at each end. The said washers $e\,e$ take up the wear which would otherwise be on the heads of the rivets and also on the rounded surface of the links, the wearing of either having a tendency toward weakening the links and throwing the same out of adjustment. The freedom of operation of said links is obtained by the amount of upsetting done to the rivet holding it, it being required that the links be just loose enough to allow of free action.

M, Fig. 1, is a yoke consisting of a solid block of metal having a shank L turned on one end, which passes through the head C, the other end being constructed the same as the link portion of yoke K.

N in the middle of the connection is known as the "regulation-yoke," which is also of metal and has channels $r\,r$, Figs. 2 and 3, opposite one another, of a depth that will permit the rounded surface of the links to set just within the outside diameter of the yoke and flush therewith. In the yoke N are two holes $f\,f$, made to receive the rivets $c\,c$, Fig. 1, which serve to hold the link $b$, Figs. 5, 6, and 7, the links having holes $g\,g$, Figs. 5 and 7, in them corresponding to those in the yoke N. The said regulation-yoke N is hollowed, as shown at 3 in Fig. 2, to decrease the weight, and the construction of the yoke varies according to strength and weight desired. Said yoke N can be made solid or hollow; but to have the same strength on all sides it is hollowed oblong in such way as to leave the same amount of metal at the line $x\,x$, Fig. 2, as at the bottom of the channels $r\,r$, Figs. 2 and 3, and may be turned out of a solid block or a tube of metal drawn according to description just given.

Such a construction of shaft has the advantage of being easily repaired, having only to replace the broken parts.

With my shaft I can get at any part very easily by removing the collar at the end of shaft with the spiral spring and its covering fastened thereto. When such head is removed, the spring comes with it and exposes the entire shaft. If any one of the links breaks, it can be replaced and does not necessitate the shortening of the shaft. If the shaft is to be made longer, as it may be at the will of the user, he can add as many links and yokes as desired and simply produce a longer spring and tubular covering therefor to correspond. The end-thrust friction where the force is applied is reduced to a minimum by means of ball-bearings, which increase the life of the shaft and apply power to the work to a better advantage and with the least possible wasted energy consistent with this style of flexible shaft. This shaft can also be made very light and at the same time retain the necessary strength.

The several parts comprising the connections between the parts G and L constitute a series of flexibly-connected links of the peculiar construction shown, and these are mainly relied upon for the work, while the spiral coil B is a coöperating portion. The head C is so constructed as to allow for expansion and contraction of the shank L.

What I claim is—

1. In a flexible shaft substantially as described, a series of parts flexibly connected and forming the body of the shaft, and one of said parts consisting of a yoke having a hollow interior oblong in cross-section, and channels in said yoke opposite the sides of its oblong hollow interior, whereby a uniform strength is obtained for said yoke all around, said channels provided with holes and links engaged in said channels and secured through said holes, substantially as described.

2. In a flexible shaft substantially as described, a series of flexibly-connected parts comprising a pair of links engaged one upon the other and half-round in cross-section, the round portion being on the outside, said links having opposite holes through the same and loosely engaging rivets through said holes and washers on said rivets bearing upon the rounded portions of the links, substantially as described.

3. In a flexible shaft, a series of flexibly-connected parts and a spiral spring inclosing the same, said parts comprising a head at one end, a set of ball-bearing plates confined within said head and balls between said plates, a stud projecting through said plates and head and threaded into one of said flexibly-connected parts next to the head, and said stud fixed to the outer plate, whereby the plates are tightened on the balls by screwing up said stud, substantially as described.

4. In a flexible shaft, a shaft having a head at one end, a set of ball-bearing plates in said head and balls between said plates, a yoke next to said head, a shank projecting through said plates and head and threaded into said yoke, and one of said plates fixedly connected with said shank and the other free thereon, and a cap over the outer end of said head having the said shank projecting through the same, substantially as described.

5. In a flexible shaft, a shaft having heads C and E at its respective ends, yokes M and K next to said heads, links $b$ rigidly fixed on said yokes, a central tubular yoke N and links $b'$ secured in channels therein and engaged with links $b'$ and an inclosing spiral spring fixed rigidly in head C and loosely overlapped by head E, substantially as described.

In testimony whereof I sign this specification in the presence of two witnesses.

ALOIS C. KADLOWEC.

Witnesses:
R. B. MOSER,
R. ZBORNIK.